(12) United States Patent
Yuan et al.

(10) Patent No.: US 10,615,619 B2
(45) Date of Patent: Apr. 7, 2020

(54) RETRACTABLE CHARGING APPARATUS

(71) Applicant: SHENZHEN LAIDIAN TECHNOLOGY CO., LTD., Shenzhen, Guangdong (CN)

(72) Inventors: Bingsong Yuan, Guangdong (CN); Weige Yu, Guangdong (CN); Changming Luo, Guangdong (CN)

(73) Assignee: SHENZHEN LAIDIAN TECHNOLOGY CO., LTD., Shenzhen, Guangdong (CN)

( * ) Notice: Subject to any disclaimer, the term of this patent is extended or adjusted under 35 U.S.C. 154(b) by 482 days.

(21) Appl. No.: 15/546,649

(22) PCT Filed: Feb. 3, 2016

(86) PCT No.: PCT/CN2016/073358
§ 371 (c)(1),
(2) Date: Jul. 26, 2017

(87) PCT Pub. No.: WO2016/127894
PCT Pub. Date: Aug. 18, 2016

(65) Prior Publication Data
US 2018/0019604 A1 Jan. 18, 2018

(30) Foreign Application Priority Data

Feb. 12, 2015 (WO) ............... PCT/CN2015/072894
Feb. 12, 2015 (WO) ............... PCT/CN2015/072904

(51) Int. Cl.
*H02J 7/00* (2006.01)
*H02J 7/32* (2006.01)
(52) U.S. Cl.
CPC .......... *H02J 7/0044* (2013.01); *H02J 7/0027* (2013.01); *H02J 7/0045* (2013.01); *H02J 7/0047* (2013.01); *H02J 7/32* (2013.01)

(58) Field of Classification Search
CPC .......... H02J 7/0044; H02J 7/32; H02J 7/0045; H02J 7/0047; H02J 7/0027
(Continued)

(56) References Cited

U.S. PATENT DOCUMENTS 5,694,019 A 12/1997 Uchida et al.
6,847,797 B2 * 1/2005 Nishihama ......... G03G 15/0233
361/221
(Continued)

FOREIGN PATENT DOCUMENTS

CN 1247354 A 3/2000
CN 1277414 A 12/2000
(Continued)

OTHER PUBLICATIONS

EP Search report from EP16748695.0, dated Jul. 24, 2018, 9 pages.
(Continued)

*Primary Examiner* — M Baye Diao (57) ABSTRACT

A retractable charging apparatus includes a retraction roller mechanism, a charging mechanism and a main PCB. The retraction roller mechanism includes a first driving apparatus, a transmission component having a power connection to the first driving apparatus, and at least one level of roller components connected to the transmission component. Each level of roller components includes two rollers disposed opposite each other. The first driving apparatus is electrically connected to the main PCB. The charging mechanism includes a charging PCB connected to the main PCB. The main PCB controls the first driving apparatus to drive the retraction roller mechanism. In use, a user places a power supply between the two rollers. The rollers retract the power supply into the charging apparatus, and convey the power (Continued)

supply to a charging mechanism for charging. After charging is completed, a retraction roller mechanism conveys the power supply out.

15 Claims, 9 Drawing Sheets

(58) Field of Classification Search
USPC .......................................................... 320/114
See application file for complete search history.

(56) References Cited

U.S. PATENT DOCUMENTS

| | | | | |
|---|---|---|---|---|
| 9,007,169 | B2* | 4/2015 | Lee | G06F 1/1632 |
| | | | | 320/111 |
| 9,407,048 | B2* | 8/2016 | George | H01R 13/72 |
| 10,236,698 | B2* | 3/2019 | Chen | B60L 53/31 |
| 2013/0132307 | A1 | 5/2013 | Phelps et al. | |

FOREIGN PATENT DOCUMENTS

| | | |
|---|---|---|
| CN | 1991896 A | 7/2007 |
| CN | 101217237 A | 7/2008 |
| CN | 102005090 A | 4/2011 |
| CN | 102467769 A | 5/2012 |
| CN | 202772633 U | 3/2013 |
| CN | 203151138 U | 8/2013 |
| CN | 10364670 A | 3/2014 |
| CN | 103646470 A | 3/2014 |
| CN | 203644131 U | 6/2014 |
| CN | 104603849 A | 5/2015 |
| CN | 204424974 U | 6/2015 |
| CN | 204557649 U | 8/2015 |
| JP | 2001101526 A | 4/2001 |
| JP | 2004013559 A | 1/2004 |
| JP | 2012191701 A | 10/2012 |
| JP | 6437673 B2 | 12/2018 |
| WO | 2016070955 A1 | 5/2016 |

OTHER PUBLICATIONS

International Search Report and Written Opinion dated Apr. 27, 2016 for PCT/CN2016/073358.
International Search Report translation from PCT/CN2016/073358.

* cited by examiner

RETRACTABLE CHARGING APPARATUS

TECHNICAL FIELD

The present invention relates to a charging apparatus, and particularly to a retractable (take-in) charging apparatus.

BACKGROUND ART

Nowadays, with rapid development of mobile devices, their functions are increasingly diversed; however, the duration-before-recharging (life) of the battery of the mobile device has not been greatly improved. Running out of power in the mobile device at a critical moment has been a trouble for many people. The prior art has not yet provided an apparatus for charging the mobile devices in public occasions, because there are special requirements for arrangement of a charging apparatus in public occasions, e.g. the convenience and simplicity of operation, the dust-proof performance of the charging apparatus, the safety, maintenance and service life of the charging apparatus, and the convenience, safety and feel at ease of users in the charging. In addition, if long or short charging lines need to be connected for the charging apparatus in public occasions, the apparatus will give a cumbersome and disorderly appearance, and electric wires will tend to be damaged and even lead to leakage of electricity. Further, a special platform is needed to accommodate the electric wires and the charged mobile power packs, so that the apparatus will become more cumbersome and disorderly and give user's a poor experience, e.g. the inconvenience caused to the users having to wait at the site and the crowded and chaotic scenario caused by the simultaneous charging of many mobile power packs. Thus, the prior art has not yet provided a good solution to the demand of charging mobile power packs in public occasions.

Therefore, it is necessary to provide a power pack charging apparatus with convenient operation, high safety, good user's experience and simple structure.

Technical Problem

An object of the present invention is to provide a retractable charging apparatus with simple and convenient operation.

Technical Solution

In order to achieve the object of the present invention, technical solutions are presented as follows:

The present invention provides a retractable charging apparatus, characterized by comprising a retraction roller mechanism, a charging mechanism and a main control PCB, wherein the retraction roller mechanism includes a first driving device, a transmission assembly in driving connection to the first driving device, and at least one roller assembly connected with the transmission assembly; each of the at least one roller assembly includes two opposite rollers; the first driving device is electrically connected with the main control PCB; and the charging mechanism includes a charging PCB connected with the main control PCB. In the present invention, the main control PCB instructs the first driving device to drive the retraction roller mechanism. In use of the retractable charging apparatus according to the present invention, so long as a user places a power pack between two opposite rollers of the at least one roller assembly, the power pack can be taken into the apparatus by the rolling of the rollers, and then conveyed to the charging mechanism for charging, and after the charging, the power pack is sent out by the retraction roller mechanism. With the retractable structural design, the users can perform a simple, convenient and flexible operation, can stably and accurately convey the power pack to be charged to the charging contacts so as to ensure the accurate contact in the charging, without needing any laborious manual adjustment and alignment for charging; and the apparatus is fast and easy to operate, times-saving and labor-saving, has a good charging performance, can improve the charging efficiency while ensuring good charging contact, is environment-friendly, and can save power consumption. The retractable charging apparatus according to the present invention can be used for charging not only mobile power packs but also common power packs of mobile products.

The at least one roller assembly may only include one roller assembly, or a first roller assembly and a second roller assembly, or a first roller assembly, a second roller and a third roller assembly, or more than three roller assemblies. These all fall within the protection scope of the present invention.

Preferably, when the retraction roller mechanism includes one roller assembly, the transmission assembly comprises a first pulley group including a first pulley connected with the first driving device, a second pulley connected with the first roller assembly, and a first belt connecting the first pulley with the second pulley. Alternatively, the transmission assembly may also use e.g. gear transmission, etc. Preferably, the first belt is a toothed belt.

Preferably, when the retraction roller mechanism includes more than one roller assembly, the transmission assembly comprises a corresponding number of pulley groups, each pulley group including two pulleys and a belt, the two pulleys and the belt of a first pulley group being connected with the first driving device and a first roller assembly, and two adjacent roller assemblies are connected through two pulleys and a belt of the other pulley group(s). By the transmission assembly, driving of the first driving device is transmitted to each roller assembly, and the roller assemblies cooperate to retract and convey the power pack. Preferably, the belt is a toothed belt. The pulleys connected to each roller assembly can be arranged on the same side or on two sides of each roller assembly. Preferably, the pulleys connected to each roller assembly are arranged on two sides of each roller assembly, so as to achieve space saving.

Preferably, when the retraction roller mechanism comprises a first roller assembly and a second roller assembly, the first roller assembly and the second roller assembly cooperate to convey the power pack. Correspondingly, the transmission assembly can also be divided into two stages for connecting the first driving device with the first roller assembly and connecting the first roller assembly with the second roller assembly; alternatively, the two-stage transmission can connect the first driving device with the first roller assembly and connect the first driving device with the second roller assembly respectively. The transmission assembly may be embodied in various means, e.g. pulley group transmission, gear transmission, etc. Preferably, the transmission assembly comprises: a first pulley group including a first pulley connected with the first driving device, a second pulley connected with the first roller assembly and a first belt connecting the first pulley with the second pulley; and a second pulley group including a third pulley connected with the first roller assembly, a fourth pulley connected with the second roller assembly, and a second belt connecting the third pulley with the fourth pulley. Preferably, the first belt and the second belt are toothed belts. The second pulley and the third pulley can be arranged on the same side or on two sides of the first roller assembly. Preferably, the second pulley and the third pulley are arranged on two sides of the first roller assembly, so as to achieve space saving.

When the retraction roller mechanism includes a first roller assembly, a second roller assembly and a third roller assembly, the transmission assembly comprises: a first pulley group including a first pulley connected with the first driving device, a second pulley connected with the first roller assembly, and a first belt connecting the first pulley with the second pulley; a second pulley group including a third pulley connected with the first roller assembly, a fourth pulley connected with the second roller assembly, and a second belt connecting the third pulley with the fourth pulley; and a third pulley group including a fifth pulley connected with the second roller assembly, a sixth pulley connected with the third roller assembly, and a third belt connecting the fifth pulley with the sixth pulley. Preferably, the first belt, the second belt and the third belt are toothed belts. The second pulley and the third pulley can be arranged on the same side or on two sides of the first roller assembly, and the fourth pulley and the fifth pulley can be arranged on the same side or on two sides of the second roller assembly. Preferably, the second pulley and the third pulley are arranged on two sides of the first roller assembly, and the fourth pulley and the fifth pulley are arranged on two sides of the second roller assembly, so as to save space. Preferably, the first driving device is a motor.

Preferably, the retraction roller mechanism further comprises a inlet/outlet door mechanism. Preferably, the inlet/outlet door mechanism comprises an eccentric shaft, a second driving device, guide rails, and a door vertically slidable along the guide rails, the second driving device being connected with the main control PCB, the eccentric shaft being connected with the second driving device, and the door including a cross bar disposed above and abutting against the eccentric shaft. The main control PCB instructs the second driving device to drive the eccentric shaft to rotate, the rotation of the eccentric shaft pushes the cross bar abutting against the eccentric shaft, which results in vertical sliding of the door along the guide rails and accordingly results in opening and closing of the door. The inlet/outlet door mechanism may also be embodied in other means, e.g. a manually opened door mechanism, an inductively opened door mechanism, etc. Preferably, the door is provided with positioning posts for limiting movement of the door in the guide rails, thereby resulting in a stable movement of the door. Preferably, the second driving device is a motor.

Preferably, the inlet/outlet door mechanism is further provided with guiding means for guiding entrance of the power pack. Generally, the guiding means conforms to the profile of the power pack to be charged so as to facilitate insertion of the power pack.

Preferably, the retractable charging apparatus further comprises a thru-beam sensor, which is arranged at the inlet of the retractable charging apparatus and is connected with the main control PCB. Generally, the thru-beam sensor is provided with a receiving end and a transmitting end arranged in a vertical direction in communication with each other through infrared rays. The thru-beam sensor can detect the in and out of the power pack. When the user introduces the power pack to be charged, the power pack obstructs the infrared rays between the two ends of the thru-beam sensor, and the thru-beam sensor produces a pulse signal such that the main control PCB is informed of entrance of the power pack and activates the first driving device so as to drive the transmission assembly, and the power pack is slowly retracted into the mechanism under the frictional force of the rollers. When the power pack is ejected, the thru-beam sensor can also detect whether the power pack has been ejected; and the thru-beam sensor can also be used to detect whether the ejected power pack has been taken away, and if not taken away overtime, the power pack will be retracted.

Preferably, the retractable charging apparatus comprises two thru-beam sensors arranged in front of and behind the first roller assembly respectively and connected with the main control PCB. In addition to all the functions of the aforementioned one thru-beam sensor, this preferred embodiment can also be used to detect the speed and position of the inserted power pack, as well as the condition of ejection of the power pack so as to prevent the forced pull-out of the power pack, and if the forced pull-out is detected, driving is started to retract the power pack.

Preferably, the rollers are each coated with a rubber layer on the surface, and a space is formed between the surfaces of the each pair of rollers for accommodating and pushing the power pack. Upon insertion of the power pack, the rubber material, which is flexible and wearing resistant, is in direct contact with the power pack, and the power pack is retracted under the rolling friction, so that the power pack can be protected from wearing. Preferably, the distance between the rubber layers of the vertically-arranged rollers is slightly smaller than the thickness of the power pack such that the retraction movement of the power pack can be more stable and precise.

Preferably, the retractable charging apparatus further comprises slide rails, which are arranged between the opposite rollers. The slide rails can be used to guide the power pack in the retraction and ejection, and has a sectional shape conforming to two sides of the power pack to be charged so as to achieve a guiding effect. Further, the slide rails can also be in a special shape if necessary for charging a special power pack and preventing entrance of another power pack in a different shape.

Preferably, the charging mechanism further comprises a PCB fixing seat, on which the charging PCB is arranged.

Preferably, the charging PCB is provided with at least two pins matching with the pole contacts of the power pack and electrically connected with the charging PCB. After the pole contacts of the power pack to be charged are brought into contact with the pins, a circuit is formed, and a data transmission is formed between the power pack and the main control PCB. The main control PCB reads various internal information of the power pack, e.g. charging capacity, temperature, ID information, current, etc., and can judge whether the insertion direction of the power pack is reversed, whether the power pack is a specific one which is permitted to be charged, or the like; and/or the main control PCB can input current into the power pack to achieve a charging function. Preferably, the charging PCB is provided with four pins matching with the pole contacts of the power pack, wherein two pins are used for charging, and the other two pins are used for data transmission. If the power pack is inserted in an incorrect direction, the two pins for data transmission detect the incorrect insertion of the power pack, and the main control PCB will drive the first driving device to rotate in an opposite direction so as to convey the power pack out.

Preferably, the tip of the pin is of a retractable pogo pin design.

Preferably, the PCB fixing seat is provided with a pin guide, through which the pin is inserted so as to improve the position accuracy.

Preferably, the PCB fixing seat is provided with a position limiting part for limiting the insertion position of the power pack. When the power pack is inserted in position, the stress on the pin may be reduced and the service life of the pin may be increased.

Preferably, the retractable charging apparatus further comprises a trigger switch disposed on the PCB fixing seat and connected with the main control PCB.

Preferably, the trigger switch is a "snap dome" typed mechanical trigger switch, and can be used to judge whether the power pack has been retracted in position. When the power pack to be charged is inserted and retracted in position, the snap dome trigger switch will be compressed, and a switch signal will be produced and transmitted to the main control PCB, wherein the trigger switch has an in-position warning effect, so as to cause the first driving device to stop working.

Preferably, the retractable charging apparatus further comprises a left-side frame and a right-side frame, between which the first roller assembly and the second roller assembly are arranged. The left-side frame and the right-side frame have the effect of stabilizing and facilitating arrangement of various elements.

Preferably, the retractable charging apparatus further comprises a fixing shaft arranged between the left-side frame and the right-side frame, and locked by a nut. The fixing shaft can produce the effect of stabilizing the left-side frame and the right-side frame.

Compared with the prior art, the present invention has the following advantages: in the retractable charging apparatus according to the present invention, the main control PCB instructs the first driving device to drive the retraction roller mechanism. In use of the retractable charging apparatus according to the present invention, so long as a user inserts a power pack between the two opposite rollers of the first roller assembly, the power pack can be retracted into the apparatus under rolling of the rollers and then conveyed to the charging mechanism for charging, and after the charging, the power pack is conveyed out by the retraction roller mechanism. The operation is simple and convenient for users. The rollers coated with the rubber layers allow a stable and safe movement of retraction or ejection of the power pack, cause no damage to the power pack, improve users' experience, and have a high operating safety. Since the power pack when being charged is housed in the retractable charging apparatus, there are no messy power lines, and the dust-proof performance, the safety and the user's experience are improved.

The embodiments of the present invention will be further described in detail below with reference to the drawings.

DETAILED DESCRIPTION OF THE INVENTION

Figure 1:
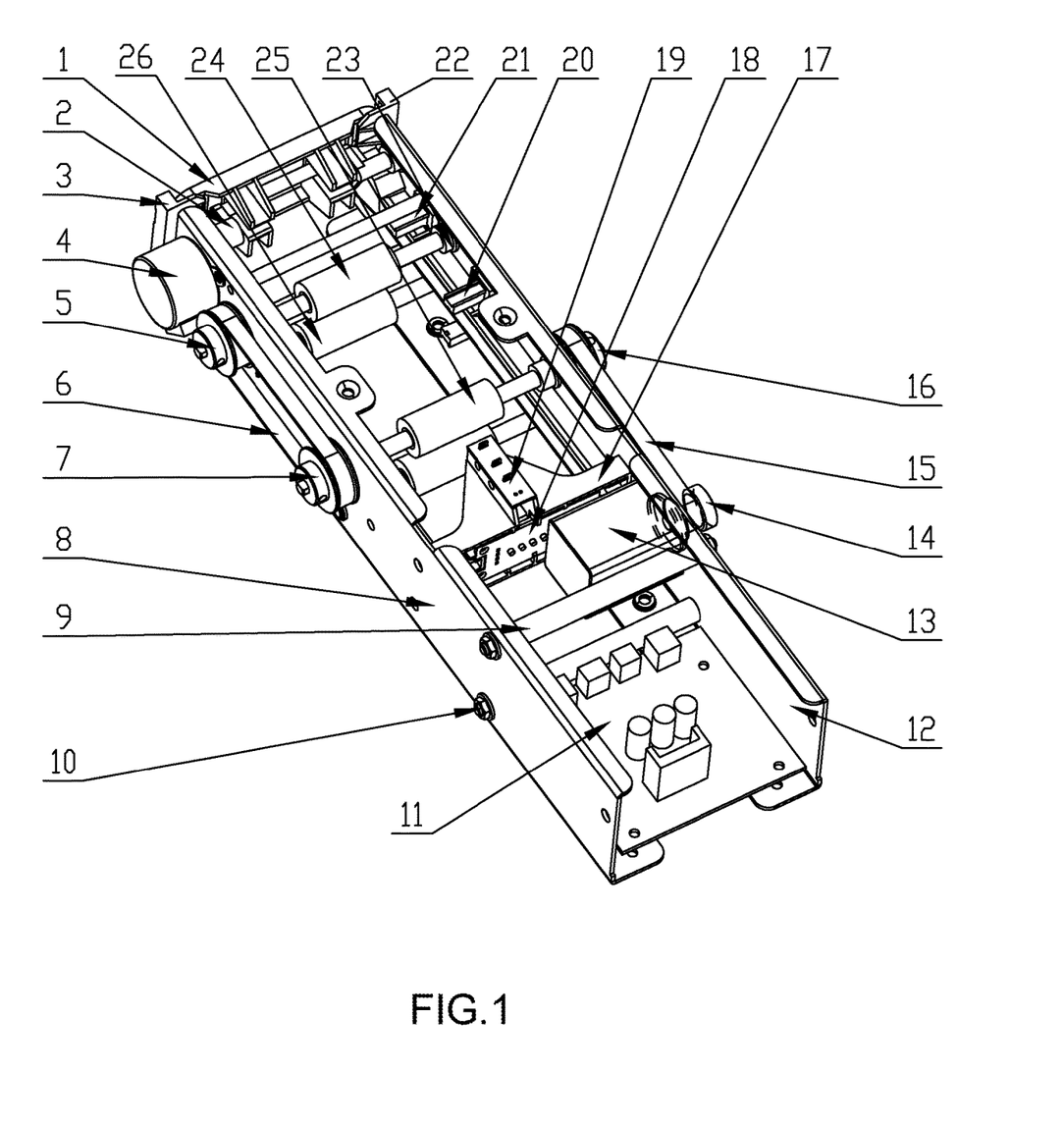
FIG. 1 is a schematic view showing Embodiment 1 of the retractable charging apparatus according to the present invention.
Figure 2:
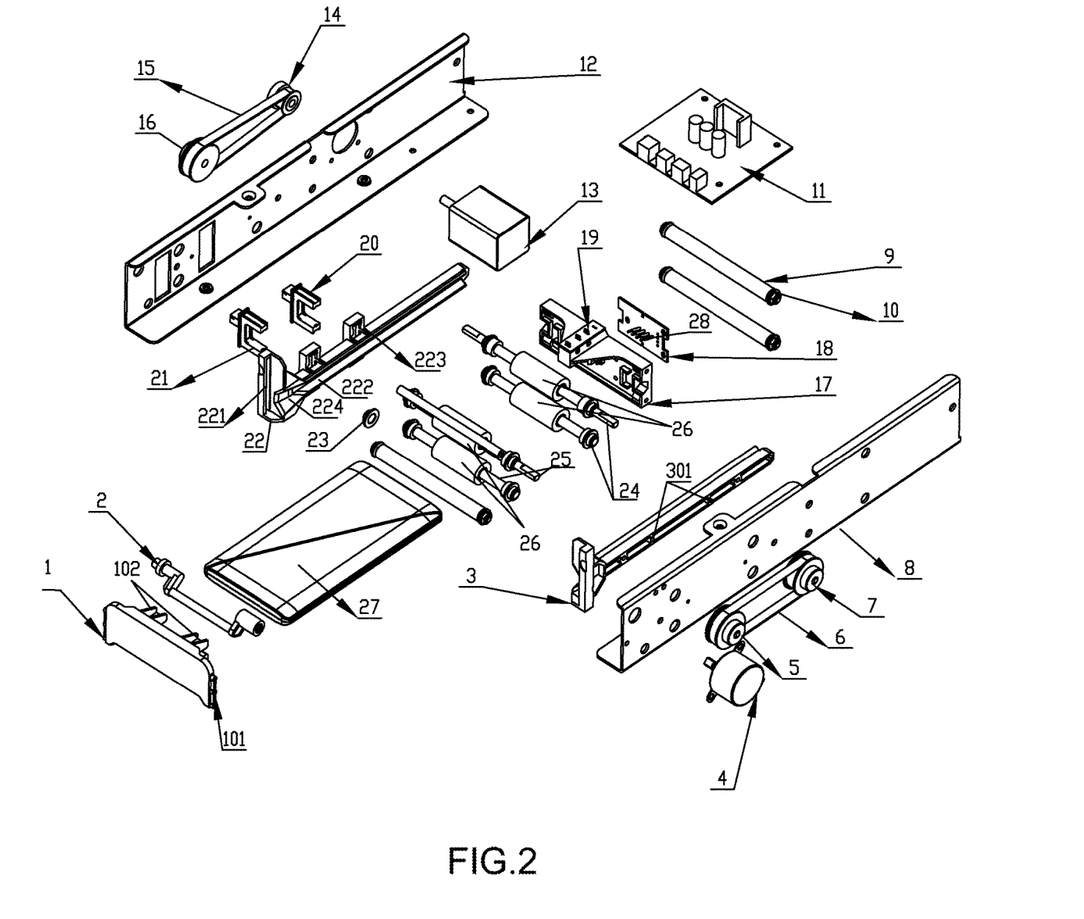
FIG. 2 is an exploded view showing Embodiment 1 of the retractable charging apparatus according to the present invention.

Referring to FIGS. 1 and 2, the present invention provides a retractable (take-in) charging apparatus, comprising a retraction (take-in) roller mechanism, a charging mechanism, a main control PCB 11, and an inlet/outlet door mechanism. The retraction roller mechanism includes a first driving device (a first motor 13 in the present embodiment), a transmission assembly in driving connection to the first motor 13, and a first roller assembly 24 and a second roller assembly 25 connected to the transmission assembly. Each of the first roller assembly and the second roller assembly includes a pair of rollers. The first motor 13 is electrically connected with the main control PCB 11. The charging mechanism includes a charging PCB 18 connected with the main control PCB 11, and the charging PCB 18 is arranged on a PCB fixing seat 17. The inlet/outlet door mechanism is connected with the retraction roller mechanism.

The transmission assembly comprises: a first pulley group including a first pulley 14 connected with a drive shaft of the first motor 13, a second pulley 16 connected with one side of the first roller assembly 24, and a first toothed belt 15 connecting the first pulley 14 with the second pulley 16; and a second pulley group including a third pulley 7 connected with the other side of the first roller assembly 24, a fourth pulley 5 connected with one side of the second roller assembly 25, and a second toothed belt 6 connecting the third pulley 7 with the fourth pulley 5.

The inlet/outlet door mechanism comprises an eccentric shaft 2, a second driving device (a second motor 4 in the present embodiment), a left guide rail 3, a right guide rail 22, and a door 1 vertically slidable along the left guide rail 3 and the right guide rail 22, wherein the second motor 4 is eclectically with the main control PCB 11, and the eccentric shaft 2 is connected with the second motor 4. The door 1 comprises a cross bar 102 disposed above and abutting against the eccentric shaft 2, and positioning posts 101 disposed at both sides for engagement with the left guide rail 3 and the right guide rail 22, wherein the left guide rail 3 and the right guide rail 22 are each provided with a guide rail groove 221 and a guide structure 224; the positioning posts 101 on the door 1, after being placed in the guide rail groove 221, may have a position limiting effect on the door 1; and the guide structure 224 is used for facilitating arrangement of the power pack 27.

A slide rail 222 is provided from between the upper and lower rollers of the first roller assembly 24 to between the upper and lower rollers of the second roller assembly 25, for guiding the power pack 27 in the retration and ejection operations. The sectional shape of the slide rail 222 conforms with two sides of the power pack 27, as shown in FIG. 3.

In the present embodiment, the left guide rail 3 and the right guide rail 22 each forms an integral unit with the slide rail 222, which is fixed to a left-side frame 8 and a right-side frame 12 of the retractable charging apparatus according to the present invention through positioning posts 301 disposed on the outer side of the slide rail 222.

Figure 3:
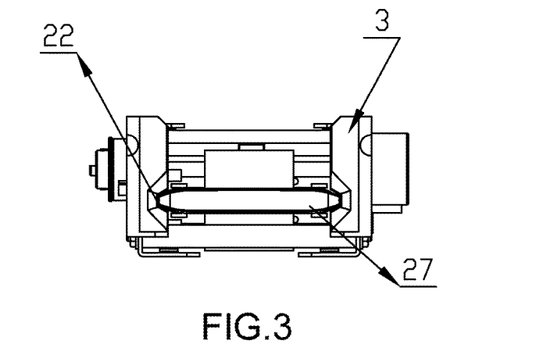
FIG. 3 is a front view showing the guide rail and the guiding means of the inlet/outlet door mechanism in Embodiment 1 of the present invention.

Referring to FIG. 3, after installation of the left guide rail 3 and the right guide rail 22, the front surface of the retractable charging apparatus forms a shape similar to the power pack 27 for the guiding thereof and additionally preventing entrance of another power pack in a different shape.

The pair of vertically arranged rollers of the first roller assembly 24 and the pair of vertically arranged rollers of the second roller assembly 25 are each coated with a rubber layer 26 on the surface, and a gap for accommodating and pushing the power pack is formed between the surfaces of the pairs of rollers. The ends of the rollers are secured to the left-side frame 8 and the right-side frame 12 by bushings 23. When the power pack is inserted, the rubber material, which is flexible and wearing resistant, is in direct contact with the power pack, and the power pack is taken in by rolling friction, so that the power pack can be protected from wearing. In a preferred embodiment, the distance between the rubber layers of the vertically-arranged rollers is slightly smaller than the thickness of the power pack to be charged such that movement of the taken-in power pack can be more stable and accurate.

Figure 4:
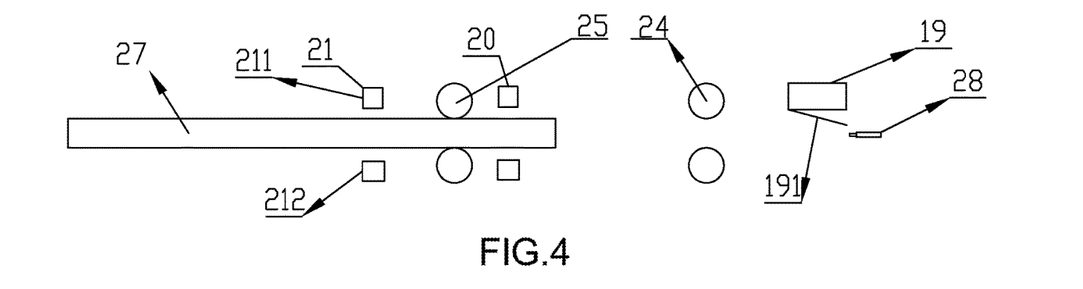
FIG. 4 is a view showing the process of the power pack being inserted in Embodiment 1 of the present invention.
Figure 5:
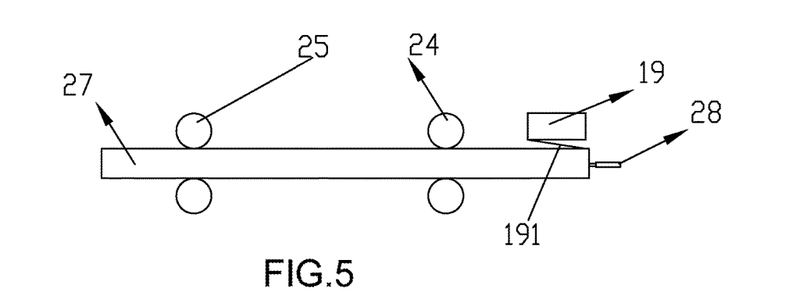
FIG. 5 is a view showing that the power pack touches the trigger switch and the pins in Embodiment 1 of the present invention.
Figures 6, 7:
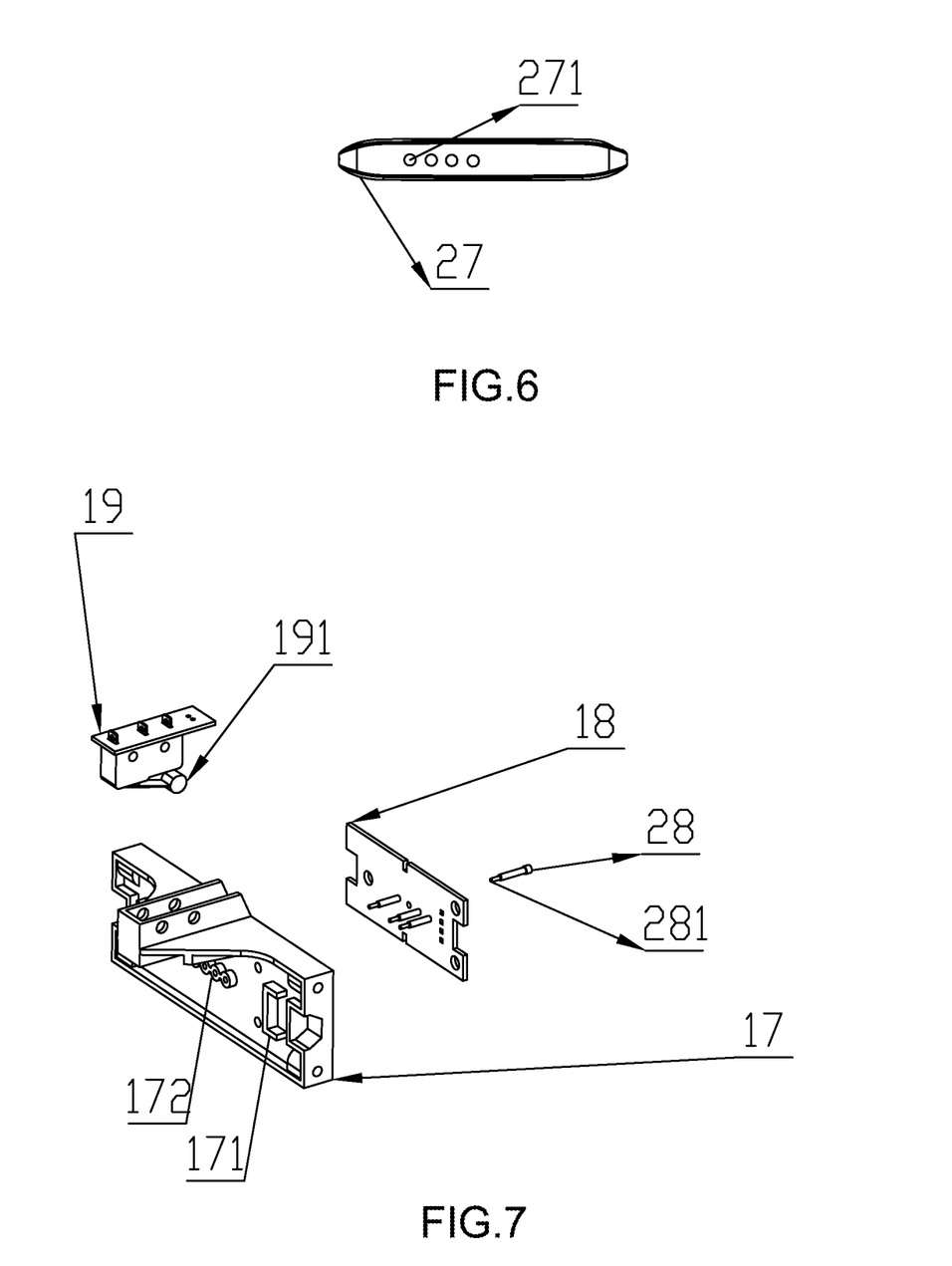
FIG. 6 is a schematic view showing the power pack to be charged in Embodiment 1 of the present invention.
FIG. 7 is a schematic view showing the charging portion in Embodiment 1 of the present invention.

Referring to FIGS. 4 and 5, two thru-beam sensors 20, 21 are disposed both in front of and behind the second roller assembly 25 respectively, and are connected with the main control PCB 11. The slide rail 222 is provided with two sensor mounting seats 223 on which the thru-beam sensors 20, 21 are mounted, and the two thru-beam sensors can detect the in and out of the power pack. The two thru-beam sensors 20, 21 each are provided with an upper receiving end 211 and a lower transmitting end 212 in communication with each other through infrared rays. When the user introduces a power pack to be charged, the power pack 27 obstructs the infrared rays between the thru-beam sensors, and the thru-beam sensors transmit a pulse signal such that the main control PCB 11 is informed of entrance of the power pack and activates the first motor 13 to drive the transmission assembly, and the power pack slowly enters into the mechanism under the frictional force of the rollers. When the power pack is ejected, the thru-beam sensors can also detect whether the power pack has been ejected and whether the ejected power pack has been taken away; if it is not taken away overtime, the transmission assembly will be driven to retract the power pack. The thru-beam sensors can also detect the speed and position of the power pack during the introduction as well as the condition of ejection of the power pack so as to prevent the forced pull-out of the power pack by a person, and if a forced pull-out is detected, driving is started to retract the power pack. Referring to FIGS. 6 and 7, the end surface of the power pack 27 to be charged is provided with pole contacts 271. In the present embodiment, the pole contact is made of copper and has a round contact surface, and the charging PCB 18 is provided with four pins 28, in which two pins used for charging match with the pole contacts 271 of the power pack, and the other two pins are used for data transmission. The pins 28 are electrically connected with the charging PCB 18. After the pole contacts 271 of the power pack to be charged are brought into contact with the pins 28, a circuit is formed for charging. Through the pins 28, the main control PCB 11 can read various internal information of the power pack 27, e.g. charging capacity, temperature, ID information, current, etc., and can input current into the power pack 27 via the contact therebetween to achieve the charging function. Further, depending on whether the information of the power pack can be read through said contacts, it can be determined whether the power pack is inserted reversely, whether the power pack is a specific one permitted to be charged, and this is an important aspect for a "smart" apparatus. If the power pack is inserted in an incorrect direction and the two pins for data transmission detect the incorrect insertion of the power pack, the main control PCB will drive the first motor to rotate in an opposite direction so as to send the power pack out.

Referring to FIG. 7, the tip 281 of the pin 28 is retractable, and is of a pogo pin design. The PCB fixing seat 17 is provided with a pin guide 172 for improving the position accuracy when the pins 28 are inserted. The PCB fixing seat 17 is provided with a position limiting part 171 for limiting the position of the power pack when the power pack 27 is inserted in position, in order to reduce the stress on the pins 28 and improve the service life thereof.

As shown in FIG. 7, the retractable charging apparatus further comprises a trigger switch 19 disposed on the PCB fixing seat 17 and connected with the main control PCB 11. The trigger switch is a "snap dome" mechanical trigger switch and has an elastic sheet 191. When the charged power pack 27 inserted in position compresses the elastic sheet 191 of the trigger switch, a switch signal will be obtained and is transmitted to the main control PCB 11, wherein the trigger switch performs a function of in-position warning. The main control PCB 11 receives the in-position signal outputted by the trigger switch 19, and causes the first motor 13 to stop working.

Between the left-side frame 8 and the right-side frame 9 is provided a fixing shaft 9, which is locked through a nut 10. The fixing shaft can stabilize the left-side frame and the right-side frame.

Figure 8:
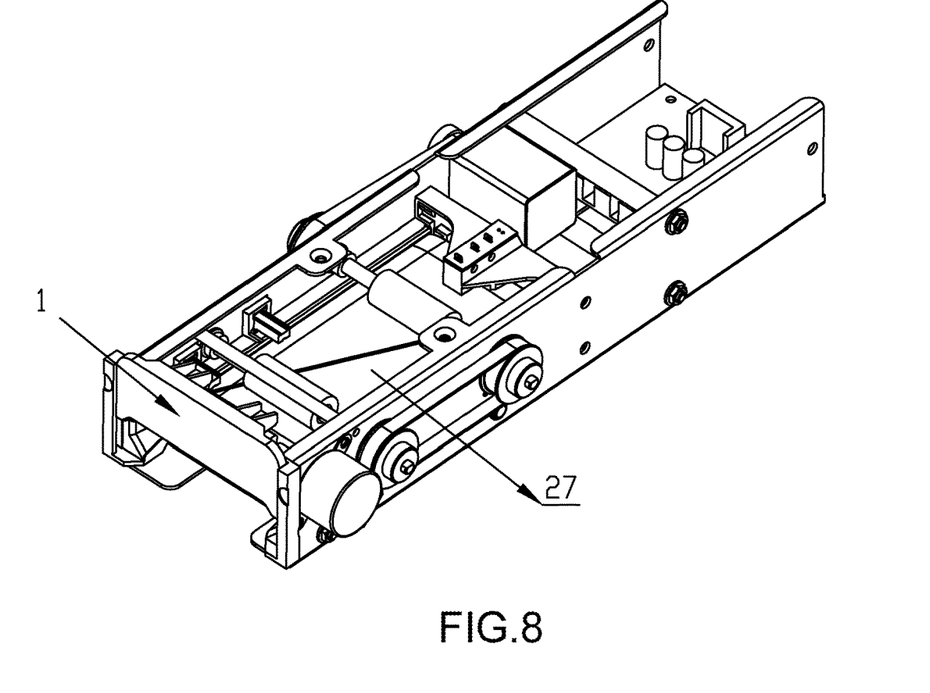
FIG. 8 is a schematic view showing retraction of the power pack when the door is opened in Embodiment 1 of the present invention.
Figure 9:
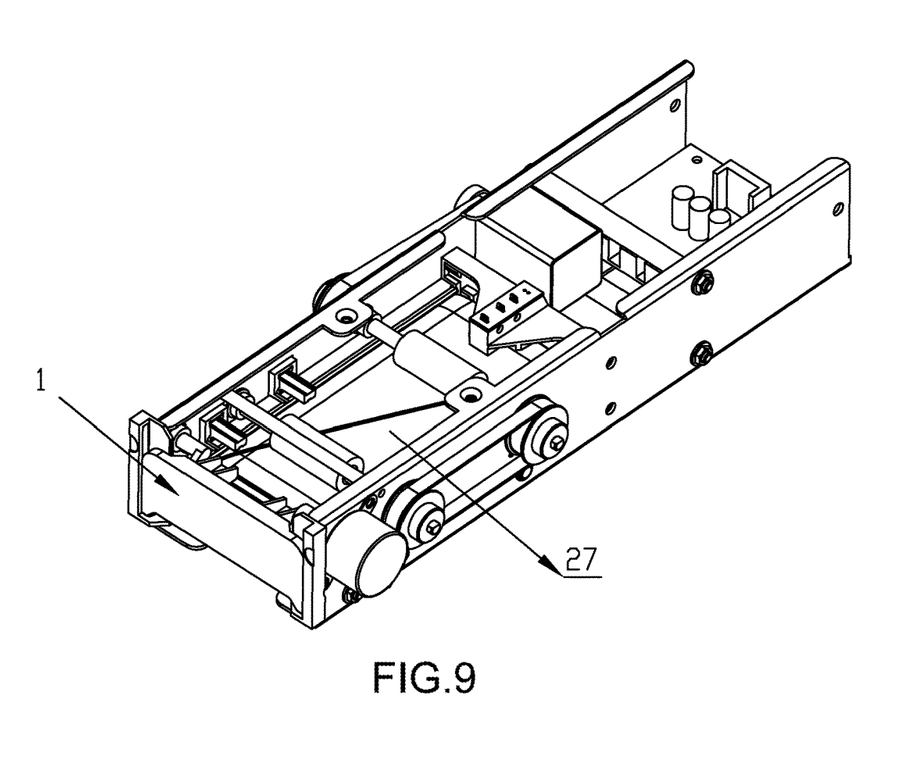
FIG. 9 is a schematic view showing that the door is closed after retraction of the power pack in Embodiment 1 of the present invention.

Referring to FIGS. 4, 5, 8 and 9, in the present invention, the main control PCB instructs the second motor 14 to drive the eccentric shaft 2 of the inlet/outlet door mechanism so as to cause the door 1 to be opened upwards (see FIG. 8). When the user introduces the power pack 27, the power pack 27 obstructs the infrared rays, and the sensor 21 produces a pulse signal to inform the main control PCB 11 of the insertion of the power pack and then the first motor 13 is activated. The first motor 13 drives the retraction roller mechanism to operate by the two-stage transmission. The second roller assembly 25 and the first roller assembly 24 of the retraction roller mechanism operate, and the power pack 27 is taken in under the frictional force of the rollers, and is slowly introduced into the mechanism under the guiding of the left guide rail 3 and the right guide rail 22. When the power pack 27 reaches the defined position, the elastic sheet 191 is actuated, and the trigger switch 19 outputs an in-position signal to the main control PCB 11, which causes the first motor 13 to stop working. Then, after the pole contacts 271 of the power pack get contact with the pins 28, the main control PCB 11 will read information of the power pack; and if no information of the power pack can be read, the main control PCB 11 will instruct the retraction roller mechanism to operate in an opposite direction so as to eject the power pack.

In use of the retractable charging apparatus according to the present invention, so long as the user places the power pack between the opposite rollers of the second roller assembly, the power pack can be taken into the apparatus by the rolling of the rollers; the power pack is conveyed through the second roller assembly and the first roller assembly to the charging mechanism for charging; and after the charging, the power pack is sent out by the first roller assembly and the second roller assembly of the retraction (take-in) roller mechanism. This is simple and convenient to operate by users.

Figure 10:
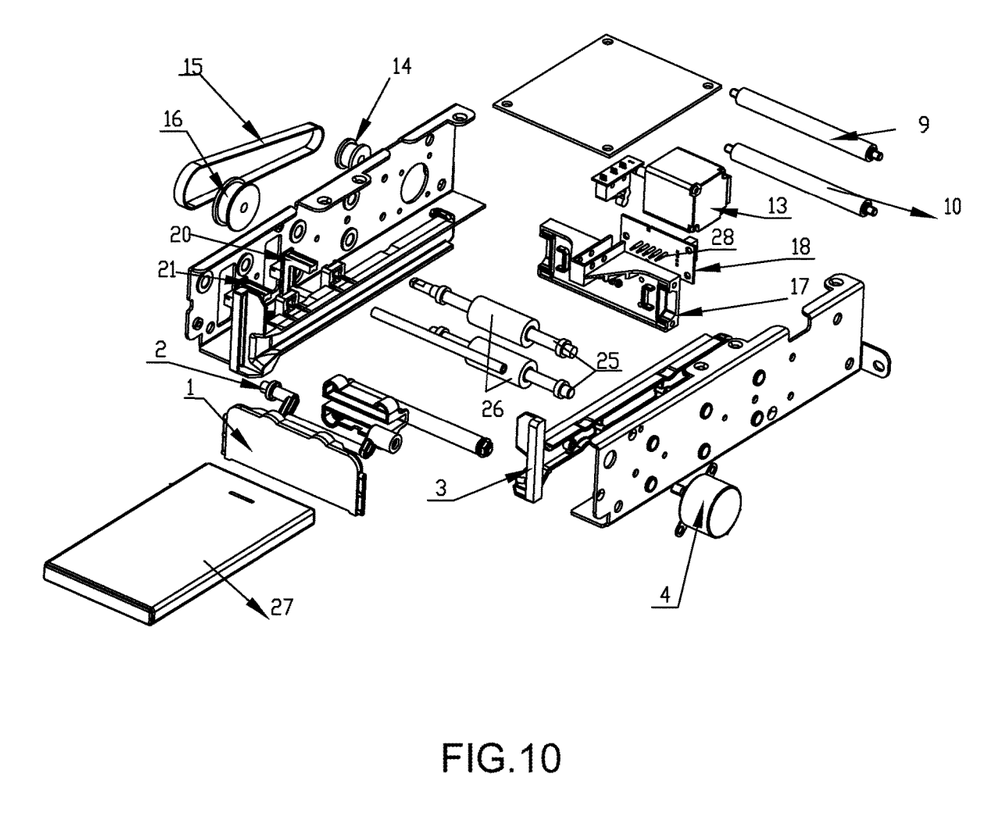
FIG. 10 is an exploded view showing Embodiment 2 of the retractable charging apparatus according to the present invention.
Figure 11:
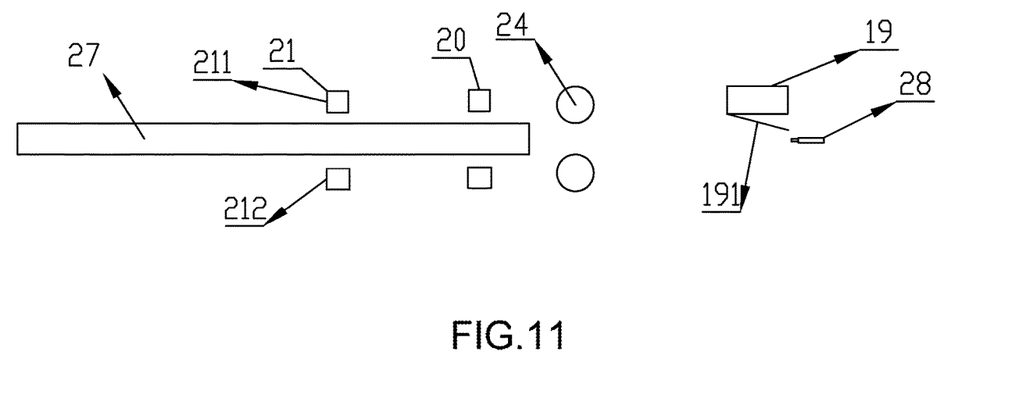
FIG. 11 is a schematic view showing the process of the power pack being inserted in Embodiment 2 of the present invention.
Figure 12:
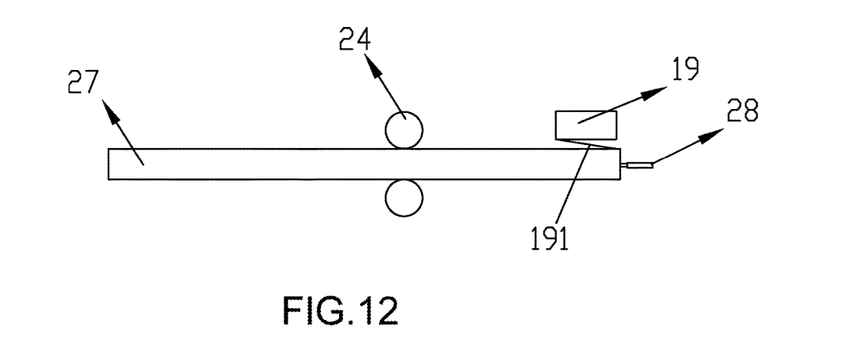
FIG. 12 is a schematic view showing that the power pack touches the trigger switch and the pins in Embodiment 2 of the present invention.

Referring to FIGS. 10-12, Embodiment 2 of the retractable charging apparatus according to the present invention differs from Embodiment 1 in that the retraction roller mechanism in the present Embodiment 2 only uses a first roller assembly 24, and the transmission assembly comprises a first pulley group including a first pulley 14 connected with a drive shaft of the first motor 13, a second pulley 16 connected with one side of the first roller assembly 24, and a toothed belt 15 connecting the first pulley with the second pulley. Two thru-beam sensors 20, 21 can be spaced apart and arranged in front of the first roller assembly 24, or can be arranged in front of and behind the first roller assembly 24 respectively.

Figure 13:
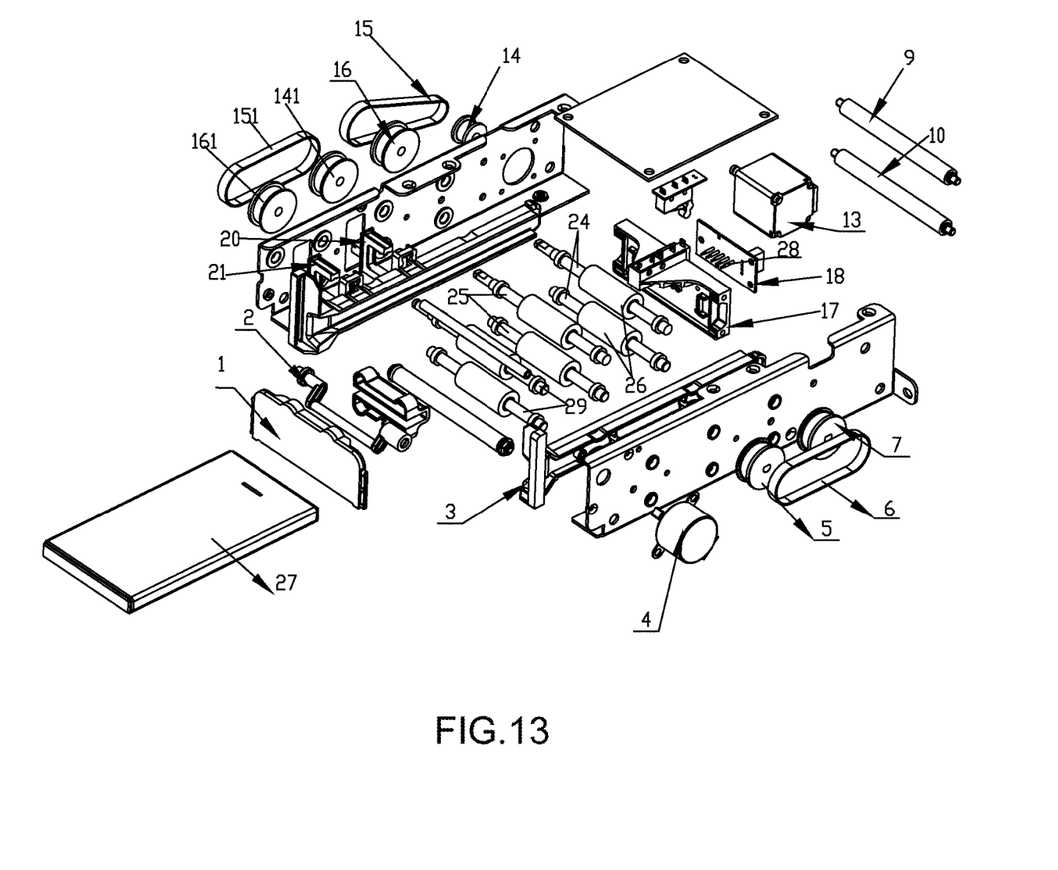
FIG. 13 is an exploded view showing Embodiment 3 of the retractable charging apparatus according to the present invention.
Figure 14:
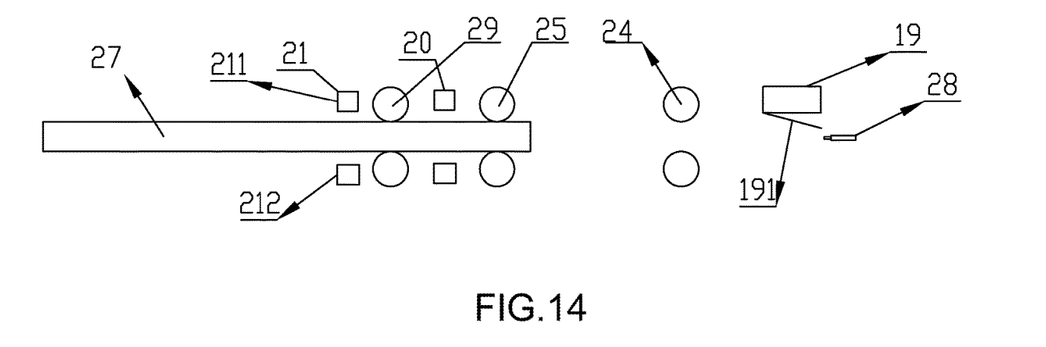
FIG. 14 is a schematic view showing the process of the power pack being inserted in Embodiment 3 of the present invention.
Figure 15:
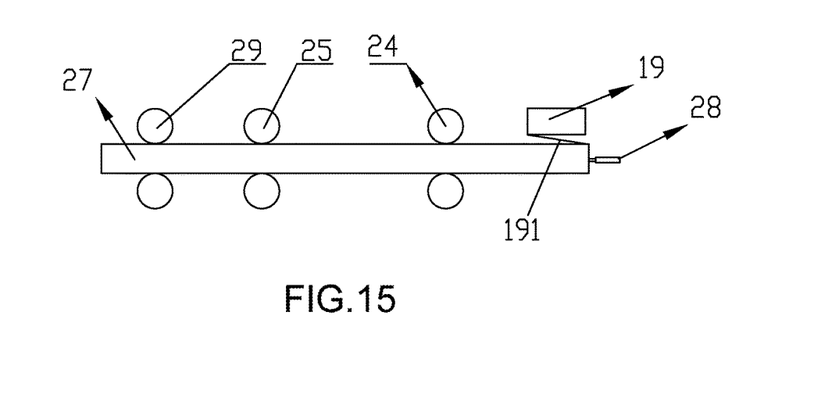
FIG. 15 is a schematic view showing that the power pack touches the trigger switch and the pins in Embodiment 3 of the present invention.

Referring to FIGS. 13-15, Embodiment 3 of the retractable charging apparatus according to the present invention differs from Embodiment 1 and Embodiment 2 in that the retraction roller mechanism in the present Embodiment 3 comprises a first roller assembly 24, a second roller assembly 25 and a third roller assembly 29, and the transmission assembly comprises: a first pulley group including a first pulley 14 connected with a drive shaft of a first motor 13, a second pulley 16 connected with one side of the first roller assembly 24, and a first toothed belt 15 connecting the first pulley with the second pulley; a second pulley group including a third pulley 7 connected with the other side of the first roller assembly 24, a fourth pulley 5 connected with one side of the second roller assembly 25, and a second belt 6 connecting the third pulley 7 with the fourth pulley 5; and a third pulley group including a fifth pulley 141 connected with the other side of the second roller assembly 25, a sixth pulley 161 connected with one side of the third roller assembly 29, and a third belt 151 connecting the fifth pulley 141 with the sixth pulley 161. Two thru-beam sensors 20, 21 are arranged in front of the third roller assembly 29, and between the third roller assembly 29 and the second roller assembly 25.

Only preferred embodiments of the present invention are described as above, and the present invention is not limited thereto. Any equivalent modification based on the technical solution of the present invention falls within the scope of the present invention.

The invention claimed is:

1. A retractable charging apparatus, comprising:
a retraction roller mechanism, a charging mechanism and a main control PCB, wherein the retraction roller mechanism includes a first driving device, a transmission assembly in driving connection to the first driving device, and at least one roller assembly connected with the transmission assembly;
wherein each of the at least one roller assembly includes two opposite rollers;
wherein the first driving device is electrically connected with the main control PCB; and
wherein the charging mechanism includes a charging PCB connected with the main control PCB.

2. Retractable charging apparatus according to claim 1, wherein the transmission assembly comprises a pulley group corresponding to the at least one roller assembly, or the transmission assembly comprises a gear group corresponding to the at least one roller assembly.

3. Retractable charging apparatus according to claim 1, wherein when the retraction roller mechanism includes more than one roller assembly, the transmission assembly comprises a corresponding number of pulley groups, each pulley group including two pulleys and a belt, the two pulleys and the belt of a first pulley group being connected with the first driving device and a first roller assembly, and two adjacent roller assemblies being connected through two pulleys and a belt of the other pulley group(s).

4. Retractable charging apparatus according to claim 3, wherein the pulleys connected to each roller assembly are arranged on two sides of each roller assembly.

5. Retractable charging apparatus according to claim 1, wherein the retractable charging apparatus comprises an inlet/outlet door mechanism.

6. Retractable charging apparatus according to claim 5, wherein the inlet/outlet door mechanism comprises an eccentric shaft, a second driving device, guide rails, and a door vertically slidable along the guide rails, the second driving device being connected with the main control PCB, the eccentric shaft being connected with the second driving device, and the door including a cross bar disposed above and abutting against the eccentric shaft.

7. Retractable charging apparatus according to claim 6, wherein the inlet/outlet door mechanism includes guiding means for guiding entrance of a power pack.

8. Retractable charging apparatus according to claim 1, further comprising a thru-beam sensor arranged at an inlet of the retractable charging apparatus and connected to the main control PCB.

9. Retractable charging apparatus according to claim 1, further comprising slide rails arranged between the opposite rollers.

10. Retractable charging apparatus according to claim 1, wherein the charging PCB is provided with at least two pins matching with pole contacts of the power pack and connected with the charging PCB.

11. Retractable charging apparatus according to claim 9, wherein the tip of each pin is a retractable pogo pin design.

12. Retractable charging apparatus according to claim 11, wherein the PCB fixing seat is provided with a pin guide through which each pin is inserted.

13. Retractable charging apparatus according to claim 11, wherein the PCB fixing seat is provided with a position limiting part for limiting the insertion position of a power pack.

14. Retractable charging apparatus according to claim 11, further comprising a trigger switch disposed on the PCB fixing seat and connected with the main control PCB.

15. Retractable charging apparatus according to claim 13, wherein the trigger switch is a snap dome typed mechanical trigger switch.

* * * * *